3,773,886
PROCESS FOR FORMING SIMULATED MARBLE

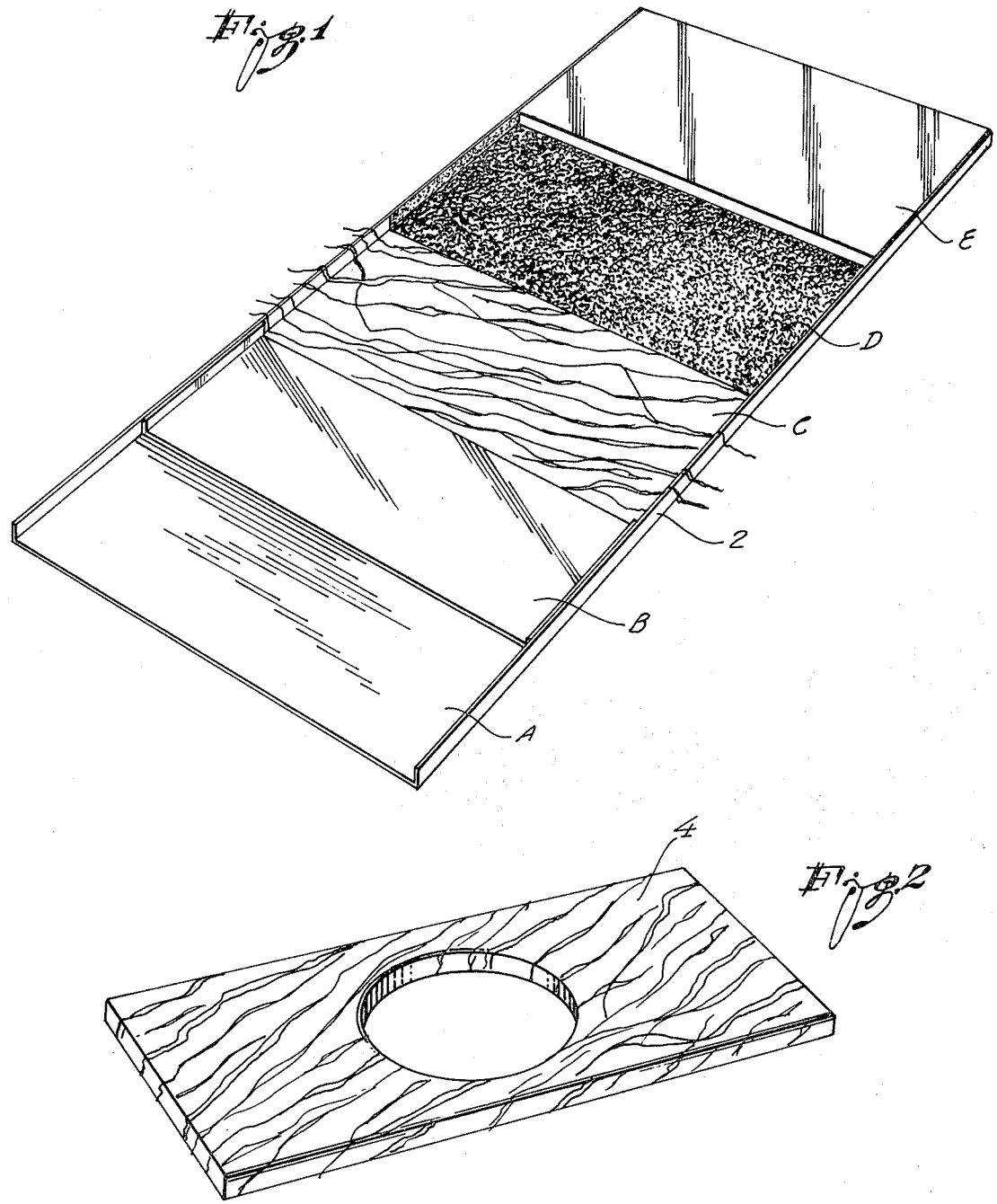

Kenneth Arnold Starr, Culver City, and George Haenl Bierdemann, Los Angeles, Calif., assignors to Fabri-Netics, Ltd., Gardena, Calif.
Filed Nov. 24, 1971, Ser. No. 201,881
Int. Cl. B28b 1/32; B29c 9/00
U.S. Cl. 264—245                                    14 Claims

ABSTRACT OF THE DISCLOSURE

A process for forming simulated marble (hereinafter referred to as "cultured marble") including applying a polyester gel-coat to a mold surface followed by successively applying vinyl and polyester veining and spatter compositions containing low-boiling solvents over the gel-coat with evaporation of substantial amounts of solvent from the respective compositions during the applying steps, then filling the remainder of the mold with resin and curing.

---

This invention pertains to a novel process for forming cultured marble. Also, the invention pertains to compositions which are particularly suitable for use in our process in forming cultured marble.

In the processes which are presently employed for forming cultured or synthetic marble, a colored veining material, such as a pigment in admixture with a polyester resin, is added to a mixer containing a highly filled polyester resin which will form the matrix material for the marbelized product. The materials are then mixed to produce a random mixing of the colored veining material within the filled matrix material, and the mixture is discharged from the mixer into a suitable mold where it is cured to form the finished product. The above described prior art procedure is illustrated by U.S. Pat. 3,562,379.

The above described prior art procedure has a number of disadvantages. First, it is difficult to control the configuration of the veins in the finished product to obtain product uniformity. As will be appreciated, if the mixture of colored veining material and matrix material are mixed for too long a time, the colored veining material will tend to become homogeneously dispersed throughout the matrix material. This would be unsatisfactory since the veining material would then produce a general colorization of the entire mixture rather than the appearance of distinct colored veins within the matrix of differently colored material. Thus, in the prior art procedure, it was necessary that the colored veining material not be mixed for too long a time with the less colored matrix material. The material discharged from the mixer, thus, did not possess uniformity with the result that wide variations could occur in the surface appearance of cultured marble pieces produced from the same mixing batch.

A further disadvantage in the mixing procedure employed by the prior art in forming cultured marble involved the practical difficulties of working with a relatively large batch of materials in a mixer. If, for example, it were desired to produce a relatively short production run of cultured marble having a particular vein colorization and a particular matrix colorization, this might be very difficult to accomplish in terms of the mixing equipment employed. If the weight of materials required for a short production run of cultured marble having a particular vein colorization, etc. constituted only half the capacity of the mixer, this would require operating the mixer while it was half full of material or only a third full if the requirements for the production run only required this much material. As will be appreciated, the inner configuration of a mixing vessel and, thus, its mixing characteristics, may differ quite substantially when the mixer is operating half full as compared with its operation when full. Thus, the need to operate the mixer at a third or half of its capacity to accommodate a particular production run would introduce even more unpredictability into the resulting surface appearance of the cultured marble product.

In switching from one mixture of materials to another in the prior art mixing procedure, it was necessary to clean the mixing vessel very thoroughly to remove any remaining colored materials from the previous batch. If this was not done, the colored materials could contaminate the subsequent batch to produce a product that did not have the desired color characteristics.

In an effort to overcome some of these problems, it was not uncommon to utilize a hand-mixing operation in which a relatively small quantity of colored veining material would be added to a selected portion of the matrix material contained within the mixer. For example, if the mixer had an open and upwardly-directed top portion, a small portion of the veining material could be added to a selected area of the upper surface of the matrix material in the mixing chamber. Following a suitable mixing period, the mixed matrix and veining material could then be removed manually from the upper portion of the mixer and then placed in a mold. This procedure alleviates some of the problems of unpredictability encountered with batch mixing to produce marbleization but, it was not a satisfactory solution since it was both inefficiently slow and laborious.

In solving the above problems of the prior art, we have developed a process in which in subsequent steps a gelled polyester film, a colored veining composition, a backup spatter composition, and a matrix composition are applied to a mold. By virtue of our procedure, it is now possible to produce cultured marble having greater uniformity than was previously obtainable. Further, it is now possible to produce color effects in cultured marble which were not previously obtainable.

In the practice of our process, a wide variation in color effects can be achieved, for example, by varying the color of the veining composition, the backup spatter composition, and also the matrix composition. In accomplishing the above results we employ a novel veining composition and backup spatter composition which have unusual flow characteristics that make them particularly suitable for use in a spraying operation in which they are sprayed through the air onto the mold surface to produce a long coherent stream, in the case of the veining composition or a discontinuous sporadic type of stream in the case of the spatter composition.

In illustrating our invention, reference is made to the accompanying drawing in which FIG. 1 shows a mold 2 broken into segments A, B, C, D and E depicting respectively a clean mold, the mold after application of a gel coat, the mold after application of a colored veining composition on top of the gel coat, the mold after application of a backup spatter composition on top of the colored veining composition, and, finally, the mold after addition of the matrix material. FIG. 2 depicts a finished cultured marble vanity top 4 manufactured in accordance with the present invention.

With reference to FIG. 1, A depicts the surface of the mold 2 prior to application of a gel coating. Before application of the gel coating, a conventional mold-release agent for a polyester resin, e.g., carnauba wax or a similar material, is applied to the inner mold surface. Following this, as depicted at B in FIG. 1, a gel coating is then applied to the mold surface.

The use of a gel coating in the forming of molded plastics is not new and this step in our process is conventional. The gel coating is a clear polyester film which, for example, may be applied to the mold by means of spraying. In accord with our process the polyester film has a thickness of about 15 to about 25 mils and preferably about 18 to about 20 mils. If the thickness of the film is much greater than about 25 mils, the film has a tendency to discolor and turn yellow. If less than about 15 mils, the film has a tendency to be attacked and swollen by the colored veining and spatter compositions which are subsequently applied. Further, if the gel coat film is made too thick, this has a tendency to lower the impact strength of the resulting product since the polyester gel coat forms a film that is relatively hard and brittle.

As an example of a typical formulation for the polyester gel coat, it may contain a polymerizable unsaturated polyester such as those prepared from ethylenically unsaturated polycarboxylic acids and polyhydric alcohols. Such materials are typically prepared by heating the polyhydric alcohols and polybasic acids under esterification conditions until the acid value of the reaction mixture is about 5 to 100 or more generally about 10 to 50. The reaction mixture is typically heated until the mixture reaches the reaction temperature at which water vapor is evolved. The temperature is then slowly increased until the desired reaction temperature is reached, after which the reaction temperature is maintained until the desired acid number is reached. For example, a typical reaction time may range from 5 to 50 hours with reaction temperatures typically ranging from 180 to 250° C. Typical ethylenically unsaturated acids utilized in the formation of polyester resins are maleic and fumaric acids.

Also, typically as part of the acid component in forming the polyester, a dicarboxylic acid may be utilized which is not ethylenically unsaturated. Such acids include, for example, phthalic acid and isophthalic acid. If the acid forms an anhydride, its acid anhydride can also be employed in the formation of the polyester resin. Various polyhydric alcohols typically employed in the formation of polyester resins are low molecular weight dihydric alcohols such as ethylene glycol and propylene glycol.

In addition to the polyester resin, there is also present a vinyl monomer and, the term polyester as employed in the present specification includes the presence of the vinyl monomer. Typical vinyl monomers are alphamethyl styrene, para-methyl styrene, divinyl benzene, methyl methacrylate, diallyl phthalate, diallyl adipate, etc. The purpose of the vinyl monomer is to make the polyester resin more fluid and also to cross link the polyester resin at the time of curing to produce a 3-dimensional or cross linked resin. Typically, polyester resin formulations may contain a vinyl monomer at a weight ratio with respect to the polyester component of about 50:50 to about 35:65.

Also present in the clear polyester gel coat is a polymerization catalyst or mixture of catalysts. One such catalyst is methyl ethyl ketone peroxide. Other such catalysts include, for example, benzoyl peroxide, tertiary butyl hydroperoxide, cyclohexyl hydroperoxide, and the like. Typically, the polymerization catalyst may be present in amounts ranging from about 0.1 to about 5 percent by weight of the polyester resin.

In addition, the clear polyester gel coat may contain promoters or other conventional additives such as antioxidants and the like. Promoters are materials which cause the catalyst to fragment more readily to supply free radicals which provide the driving force for the polymerization reaction. Typical promoters are compounds of cobalt and the other transition metals, such as cobalt naphthenate or cobalt octoate and, optionally, include the use of additional secondary promoters such as quaternary amine compounds. Also, the polyester gel coat may contain inhibitors to control the polymerization time. Inhibitors are materials which soak up free radicals. In so doing, the inhibitors or retardants serve to slow down the rate of polymerization by adsorbing the free radicals which would otherwise be available to drive the polymerization reaction. In the course of absorbing free radicals, the inhbitor or retardant is progressively destroyed, after which the polymerization reaction proceeds at a more rapid rate.

All of the above information concerning polyester resins and their makeup is conventional and is included only as background material to aid in understanding the invention. The polyester resin systems which we employ in forming the gel coating for the mold typically contain about 70 percent by weight of solids and about 30 percent by weight of the vinyl monomer which serves additionally as the solvent for the polyester. It is desirable that the polyester gel coat resin have thixotropic flow properties so that it will adhere to the vertical surfaces of the mold. Thus, the polyester gel coat resin may contain conventional additives to provide thixotropic viscosity characteristics, such as a finely divided pyrogenic silica, hydrogenated castor oil compounds, etc.

The polyester materials which we employ in forming the gel coat do not contain surfacing agents. Surfacing agents are waxy materials which are included in some polyesters to provide an exposed tack-free surface. In the performance of our process, it is necessary that the exposed upper surface of the polyester gel coat be tacky and be solvent sensitive so that the subsequently applied materials will bond securely to the outer gel coat film. As the gel coat undergoes gelation, it undergoes a slight color change and loses its high gloss to take on more of a satin type of finish. The tackiness of the gel coat can be conveniently determined by the operator by, for example, merely pressing his finger against the exposed surface. Typically, a polyester gel coating containing 2 percent by weight of methyl ethyl ketone peroxide may take approximately 25±5 minutes for gelation at a curing temperature of about 77° F. For each 1° F. drop in the curing temperature, the time required for gelation will be extended approximately 4 minutes. The time required for gelation of the polyester gel coat film may, of course, be speeded up by using a heated environment.

After the polyester gel coat has reached a tacky consistency, as described above, a colored veining composition is then applied to the tacky gel coating. The appearance of the mold surface after application of the colored veining composition is depicted at C in FIG. 1. The colored veining composition comprises a mixture of a conventional polyester resin material including a vinyl monomer, as described previously, together with a rubbery material such as a vinyl polymer or vinyl copolymer such as polyvinyl chloride, polyvinylidene chloride, or acrylonitrile copolymer. Also, there may be used as the rubbery material such materials as synthetic rubber, nitrocellulose, chlorinated rubber compounds, etc.

Our colored veining composition may contain from about 25 to 75 and preferably about 40 to 60 percent by weight of a conventional polyester resin composition including a vinyl monomer, as defined previously, and about 5 to 15 and preferably about 8 to 12 percent by weight of a rubbery polymeric material, as exemplified by a vinyl copolymer. There is also present from about 20 to 60 and preferably about 32 to 48 percent of an organic solvent in which the polyester and the rubbery material are mutually soluble. Conventional additives such as promoters, UV light absorbers, antioxidants, fire retardants, etc. may also be present. The solvent is present in a sufficient amount to provide the veining composition with a viscosity of about 25 to about 500 and preferably about 75 to about 125 centipoises "cps." as measured with a Brookfield Viscometer at 77° F.

In addition, the colored veining composition may optionally contain a polyester polymerization catalyst at a concentration ranging from about 0.5 to about 5.0 percent by weight of the polyester resin material including the vinyl monomer copresent therewith. Also, there is present a pigment dispersion at whatever concentration is desired to give the required color to the veining composition. Typically, the veining composition may contain a pigment dispersion in an amount of about 10 percent by weight of the total composition. The pigment may be, for example, an inorganic oxide such as chromic oxide, red iron oxide, calcium carbonate, carbon black, cadmium sulfide, or finely divided metals or organic dyes. Essentially any material can be used as a pigment providing that it is compatible with the polymeric materials utilized in the veining composition.

In applying the veining composition to the mold surface to produce a veined pattern as illustrated at C in FIG. 1, the veining composition may, for example, be applied to the mold surface by use of a conventional spray gun. The presence of the rubber-like constituent exemplified by a vinyl copolymer in the veining composition provides the composition with long-flow properties and discontinuous atomization properties when passed through the nozzle of the spray gun. As the material passes through the nozzle of the spray gun, where it is admixed with air and falls through the air onto the mold surface, a portion of the solvent (about 25 to about 75 percent) in the veining composition evaporates. Preferably, the solvent is a relatively low boiling solvent having a boiling point at atmospheric pressure ranging from about 130° F. to about 200° F. Typical of such solvents are acetone, methyl ethyl ketone, methylene chloride, methanol and the like. It should be understood that the choice of the particular solvent is predicated, to some extent, on the other materials present in the veining composition. As stated previously, the solvent is a mutual solvent for the polyester and the vinyl monomer copresent therewith as well as the rubbery material or mixtures of such materials characterized by a vinyl copolymer, etc. Also, of course, the solvent is compatible, i.e., relatively nonreactive, with the other ingredients present in the veining composition.

As the veining composition is applied to the mold surface to produce the colored veins that are representative of marble, the veining composition falls through the air where a portion of the solvent evaporates. As the solvent evaporates, the stream of material takes on the long-flow characteristics required in our process. While not bound by any theory, it is believed that long-flow properties which result are caused by the solidification of the rubber-like polymeric material which is present in our veining compositions. Inasmuch as there is a correlation between the solvent evaporation from the veining composition and its flow properties, the distance which the veining composition falls through the air to the mold surface (which determines the amount of time that the veining composition is exposed to the air) must be correlated with the volatility characteristics of the solvent in the veining composition. If the solvent is relatively low boiling, the veining composition may be applied from a shorter distance above the mold surface. However, if the solvent is a higher boiler, it may be desirable to expose the veining composition to air for a longer time before it makes contact with the mold surface.

In a manual spraying operation, it was found that use of a pressure-cup spray gun of a bleeder or non-bleeder type utilizing either an internal or external mix air nozzle produced satisfactory results. Typical operating conditions, for example, utilized an atomizing air pressure of 60 to 70 p.s.i., with a spray fan width of 10 to 12 inches, a fluid tip orifice of 0.080 to 0.100 inches, and a fan-type nozzle.

In laying down the veined pattern on the mold surface by use of a spray gun, the gun may be held in an upright position, and (utilizing a low boiling solvent in the veining composition) at a distance of about 28 to 30 inches above the mold surface. The spray gun may then be moved across the width of the mold with a slight upward sweep. Typically, the veined patterns may be sprayed on 6 to 8 inch centers diagonally across the width of the mold at approximately a 30° angle with respect to the edge of the mold. Following the spraying of the straight line diagonal patterns, the patterns may be broken up by spraying veins to produce an interference pattern in which the subsequently applied veins are sprayed on a slightly greater angle with respect to the mold edge and serve to connect the originally sprayed diagonal veins which are adjacently positioned.

Our method is not restricted to any particular form of spraying and it may be carried out by a machine in which the spray nozzles are fixed and the molds are moved under the spray nozzles in a programmed manner to produce the desired veined pattern. Also, the mold may be fixed and the spray nozzles moved with respect to the mold, or, the veining may be applied by means of a curtain coating procedure in which the composition is merely permitted to fall in a predetermined manner through a predetermined distance onto the mold surface.

After application of the veining composition to the mold surface and while the veining composition is still in a wet liquid state, a spatter composition is applied to the mold. The spatter composition is quite similar in some respect to the veining composition as described previously. The spatter composition contains a conventional polyester resin which includes, as previously described, a vinyl monomer. Also, the spatter composition contains a rubber-like material as described previously, which is exemplified by a vinyl copolymer.

The spatter composition contains about 75 to 95 and preferably about 85 to 90 percent by weight of a conventional polyester resin, including vinyl monomer, and about one to 5 and preferably about 2 to 3 percent by weight of a rubber-like material as exemplified by a vinyl copolymer. There is also present from about 4 to about 20 and preferably about 8 to about 12 percent of an organic solvent, as described previously, in which the polyester resin and rubber-like material are mutually soluble. The solvent is present in an amount sufficient to give the spatter composition a viscosity of about 100 to about 3,000 cps. and preferably about 400 to about 800 cps. as determined with a Brookfield Viscometer at 77° F. As described previously in regard to the veining compositions, the organic solvent preferably has a boiling point of about 130 to aboupt 200° F. at atmospheric pressure.

It is essential that the spatter composition contain a polymerization catalyst for the polyester resin. The polymerization catalyst is present in an amount of about 0.5 to about 5.0 percent of the polyester resin including the vinyl monomer which is copresent therewith. Also, the spatter composition contains an inorganic pigment, a powdered metal, or a dye, as described previously, to impart the desired color.

In our process, the color applied by the spatter composition may be varied from that applied by the veining composition to provide a two-tone effect in the cultured marble product. By way of example, the veining composition may be colored black to impart a striated pattern of black veins running throughout the surface of the marble. As a background of this pattern, the spatter coating composition may, for example, be colored a light green to produce a two-tone effect in the final product of heavy dark black veins agains a randomly dispersed greenish spatter background.

The most important consideration in regard to the spatter composition are its flow properties. Unlike the veining compositions, as previously described, the spatter composition has short flow properties and discontinuous atomization properties to produce discontinuous and random shaped coloration on the mold surface when applied thereto as, for example, by spraying. The appearance of the mold after application of the spatter coating is depicted in FIG. 1 by D. In a typical application of the spatter coating by a standard cup-type spray gun, the atomizing air pressure was 90 to 125 p.s.i. with a maximum fluid delivery rate, a minimum round spray fan width, a fluid tip orifice of 0.08 to 0.10 inches in diameter, and a 0.125 inch round atomizing air nozzle.

As described previously with regard to the veining composition, the spatter composition is applied to the mold in such a manner that it first is in contact with air. To function properly in our process, about 25 to about 75 percent by weight of the solvent in the spatter composition is evaporated before the composition makes contact with the mold. The spatter composition may be applied by hand or machine spraying or by means of a curtain coating procedure. Any means of application may be used so long as the composition first makes contact with the air, as described previously.

In the application of the veining composition and the spatter composition to the mold surface, the spatter composition may, for example, cover as much as 50 percent or more of the mold surface including the vertical mold walls while the veining composition may cover about 5 to 15 percent of the available surface area of the mold surface.

After application of the spatter composition to the mold surface, the mold is then filled with a polyester matrix material. The polyester matrix material is a conventional polyester, as described previously with regard to the gel coat, and contains from about 0.1 to about 5.0 percent by weight of a conventional polyester polymerization catalyst. The matrix composition will be filled or may contain reinforcing material. Typically, the matrix material is loaded, for example, with calcium carbonate at a weight ratio of calcium carbonate to polyester resin (including the vinyl monomer) of about 4 to 5 to 1. Preferably, the catalyst concentration in the matrix composition is adjusted to correspond with the catalyst concentration in the spatter composition which was previously applied to the mold surface. This provides a relatively uniform curing of the spatter composition and the matrix composition so that both cure in approximately the same time.

It is extremely important that the polyester resin matrix material be added to the mold before either the veining composition or spatter composition have undergone either gelation or evaporation skin-over. Evaporation skin-over will occur prior to gelation and, thus, is the limiting factor in determining when to added the matrix material to the mold.

Evaporation skin-over occurs when a certain quantity of the solvent has evaporated from the veining composition or spatter composition previously applied to the mold surface. As the solvent evaporates on the exposed surface, of the veing or spatter compositions, a skin or coating forms over the exposed surface. If this occurs prior to addition of the matrix material to the mold, the surface of the finished article has a hard undesirable appearance in which the surface colorations merely appear to be superimposed, one over the other. Typically, evaporation skinover may occur within about 5 to 10 minutes if the solvent is a relatively low boiling solvent, as described previously. Thus, under these conditions, the matrix composition must be added to the mold within a relatively short period after application to the mold of the veining composition and the spatter composition. The appearance of the mold after addition of the matrix composition is illustrated by E in FIG. 1 of the drawing.

In the functioning of our described process, the veining composition and spatter composition are both in a wet state without the occurrence of evaporation skin-over prior to the addition of the matrix composition to the mold. As a result, there is a bleeding of the color between the several materials in the mold during and prior to curing. Bleeding may, thus, occur from the veining composition into the spatter composition, from the veining composition into the matrix composition, and from the spatter composition into the matrix composition. As a result of this bleeding, there is created an illusion of depth on viewing the veing and spatter background in the surface of the cultured marble product. Without bleeding, the various materials would appear as though they were merely superimposed one upon the other which would not create the appearance of depth of grain as observed in natural marble.

In addition to bleeding of the color between thhe several materials in the mold, there is also a transfer of catalyst between the several materials in the mold. As described previously, the veining composition does not require the presence of a polymerization catalyst although such a catalyst may optionally be present. If a polymerization catalyst is not present in the veing composition, the transfer of catalyst to the veining composition from the spatter composition or matrix composition provides the polyester polymerization catalyst required for cure of the veining composition.

After addition of the matrix composition to the mold, the overall composition is then cured to produce a cultured marble product. Curing may be conducted at ambient temperatures if, for example, promoters are present to produce a low temperature cure. Also, however, the composition article may be cured by the application of heat. Following the curing operation, the finished article is then removed from the mold.

The application of our method produces a cultured marble product having a surface uniformity that was previously unattainable. Moreover, our process eleminates the various disadvantages which result from the use of a batch type mixing operation in producing a cultured marble product. The appearance of a finished article produced by our process, such as a vanity top, is illuustrated in FIG. 2 of the drawing.

Our process has particular suitability to the manufacture of matched die molded products. In this type of operation, one of the molds of the die is treated in the manner described previously, i.e., application of a clear gel coating, followed by the application of the veining composition, and then a spatter composition. At this point, the mold is assembled and the matrix material is poured into the opening between the die surfaces. On removal of the article from the dies, the outer surface of the article conforming with the mold portion which had previously been treated in accordance with the present invention will have a cultured marble appearance.

Prior to this time, it was very difficult to produce a cultured marble appearance in a matched die molded product since it was then necessary to pour the mixed marbelizing composition into the small opening between the assembled dies. The use of such a procedure produced products which were non-uniform in appearance for the various reasons pointed out previously. Also, in addition, the affect of the constrained flow pattern within the assembled dies after injection of the composition into the die opening produced nonuniformity.

In describing our process, it as been described with respect to the use of polyester resins as the binding ingredient. It should be understood, however, that our process may have application to other resin systems such as epoxy resins or to acrylic resins such as polymethyl methacrylate.

We claim:
1. A process for forming cultured marble comprising:
   (1) forming a clear polyester gel coat film on a mold surface, said film having a thickness ranging from about 15 to about 25 mils;
   (2) applying a colored veining composition by having the veining composition fall through the air onto selected portions of the exposed surface of said polyester film while the film is still tacky, said colored veining composition comprising an unsaturated polymerizable polyester resin, a vinyl polymer or copolymer, and an organic solvent having a boiling point at atmospheric pressure of about 130 to about 200° F., said polyester resin constituting from about 25 to about 75 percent by weight of said colored veining composition, said vinyl polymer or copolymer constituting from about 5 to about 15 percent by weight of said veining composition, and said organic solvent constituting from about 20 to about 60 percent by weight of said veining composition, said organic solvent being a mutual solvent for said polyester resin and said vinyl polymer or copolymer and said solvent being present in an amount sufficient to provide a viscosity for said veining composition of about 25 to about 500 centipoises as measured with a Brookfield Viscometer at 77° F., and evaporating the solvent in the veining composition prior to contact of the veining composition with the gel coat film, such that about 25 to about 75 percent of said solvent undergoes evaporation before contact of said veining composition with the gel coat film;

(3) applying a colored spatter composition by having the spatter composition fall through the air onto selected portions overlying the mold surface, said spatter composition containing an unsaturated polymerizable polyester resin, a vinyl polymer or copolymer, a polyester polymerization catalyst, and an organic solvent having a boiling point at atmospheric pressure of about 130 to about 200° F., the concentration of said polyester resin in said spatter composition ranging from about 75 to about 95 percent by weight, the concentration of said vinyl polymer or copolymer in said spatter composition ranging from about 1 to about 5 percent by weight, the concentration of said polyester polymerization catalyst ranging from about 0.5 to about 5 percent by weight of said polyester resin and the concentration of said organic solvent in said spatter composition ranging from about 4 to about 20 percent by weight, said organic solvent being a mutual solvent for said polyester resin and said vinyl polymer or copolymer and said solvent being present in an amount sufficient to provide a viscosity for the splatter composition of about 100 to about 3,000 centipoises as measured with a Brookfield Viscometer at a temperature of 77° F., and evaporating the solvent of the spatter composition prior to contact of the spatter composition with the selected portions overlying the mold surface, such that about 25 to about 75 percent of said solvent in said spatter composition undergoes evaporation before contact of said splatter composition with said selected portions;

(4) adding to said mold a catalyzed polyester resin matrix composition which is filled or reinforced, said matrix composition being added to the mold while the colored veining composition and colored spatter composition are in a wet liquid state and prior to evaporation skinover of said veining composition or said spatter composition;

(5) curing the said matrix composition, said veining composition and said spatter composition within the mold to form a cultured marble object, and (6) removing said cultured marble object from the mold.

2. The process of claim 1 wherein said colored veining composition contains from about 40 to about 60 percent by weight of said polyester resin, from about 8 to about 12 percent by weight of said vinyl polymer or vinyl copolymer, and from about 32 to about 48 percent by weight of said organic solvent.

3. The process of claim 1 wherein said spatter composition contains from about 85 to about 90 percent by weight of said polyester, from about 2 to about 3 percent by weight of said vinyl polymer or vinyl copolymer, and about 8 to about 12 percent by weight of said organic solvent.

4. The process of claim 1 wherein said colored veining composition has a viscosity of about 75 to about 125 centipoises as measured with a Brookfield Viscometer at 77° F.

5. The process of claim 1 wherein both said colored veining composition and said colored spatter composition are applied to said mold surface by spraying.

6. The process of claim 1 wherein said veining composition is a different color than said spatter composition.

7. The process of claim 1 wherein the veining and spatter compositions are applied by curtain coating.

8. The process of claim 1 wherein said colored veining composition contains from about 40 to about 60 percent by weight of said polyester resin, from about 8 to about 12 percent by weight of said vinyl polymer or vinyl copolymer, and about 32 to about 48 percent by weight of said organic solvent, and said colored spatter composition contains from about 85 to about 90 percent by weight of said polyester, from about 2 to about 3 percent by weight of said vinyl polymer or vinyl copolymer, and about 8 to about 12 percent by weight of said organic solvent.

9. The process of claim 8 wherein said colored veining composition has a viscosity of about 75 to about 125 centipoises as measured with a Brookfield Viscometer at 77° F.

10. The process of claim 3 wherein said colored spatter composition has a viscosity of about 400 to about 800 centipoises as measured with a Brookfield Viscometer at 77° F.

11. The process of claim 8 wherein said spatter composition has a viscosity of about 400 to about 800 centipoises as measured with a Brookfield Viscometer at 77° F.

12. The process of claim 8 wherein both said colored veining composition and said colored spatter composition are applied to said mold surface by spraying.

13. The process of claim 8 wherein said colored veining composition is a different color than said spatter composition.

14. The process of claim 8 wherein the veining and spatter compositions are applied by curtain coating.

References Cited
UNITED STATES PATENTS

| | | | |
|---|---|---|---|
| 3,341,396 | 9/1967 | Iverson | 264—73 X |
| 3,328,499 | 6/1967 | Barnette | 264—245 X |
| 3,129,110 | 4/1964 | Anderson | 260—862 X |
| 3,232,819 | 2/1966 | Satas | 264—41 |

ROBERT F. WHITE, Primary Examiner

W. E. HOAG, Assistant Examiner

U.S. Cl. X.R.

117—39, 132 B; 264—254, 255